US006542464B1

(12) United States Patent
Takeda et al.

(10) Patent No.: US 6,542,464 B1
(45) Date of Patent: Apr. 1, 2003

(54) HIGH THROUGHPUT WIRELESS DATA COMMUNICATION USING TRANSFERRED PROTOCOL DATA FOR COMMUNICATION ACROSS LAND-LINE NETWORK

(75) Inventors: Kenji Takeda, Tokyo (JP); Tomoki Osawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/131,176

(22) Filed: Aug. 10, 1998

(30) Foreign Application Priority Data

Aug. 8, 1997 (JP) .............................. 9-214898

(51) Int. Cl.[7] .............................. H04H 7/30
(52) U.S. Cl. .................. 370/230; 370/235; 370/466
(58) Field of Search ................. 370/230, 235, 370/328, 338, 347, 465, 466, 469, 470, 473; 714/1, 2, 746, 748

(56) References Cited

U.S. PATENT DOCUMENTS 5,553,083 A * 9/1996 Miller .......................... 714/748
5,570,367 A * 10/1996 Ayanoglu et al. ........... 370/229
5,974,028 A * 10/1999 Ramakrishnan ............. 370/229

FOREIGN PATENT DOCUMENTS

| JP | 63-40423 | 2/1988 |
| JP | 2-23741 | 1/1990 |
| JP | 5-83157 | 4/1993 |
| JP | 6-29959 | 2/1994 |
| JP | 6-85875 | 3/1994 |
| JP | 6-112874 | 4/1994 |
| JP | 7-183873 | 7/1995 |

OTHER PUBLICATIONS

Balakrishnan et al, Improving Reliable Transport and Handoff Performance in Cellular Wireless Networks, ACM Networks, pp. 1–19, Dec. 1995.*
Bakre, Design and Implementation of Indirect Protocols for Mobile Wireless Environment, Dissertation, Rutgers University, pp. 1–175, Oct. 1996.*
Iftode et al, Improving the Performance of Reliable Transport Protocols in Mobile Computing Environments, IEEE, pp. 850–857, Jun. 1995.*
Balkrishnan et al, A Comparison of Mechanisms for Improving TCP Performance over Wireless Links, ACM, pp. 1–14, Aug. 1996.*
Jacobson et al, TCP Extension for Long–Delay Paths, RFC 1072, pp. 2–18, Oct. 1988.*

* cited by examiner

Primary Examiner—David Vincent
Assistant Examiner—Frank Duong
(74) Attorney, Agent, or Firm—Dickstein, Shapiro, Morin & Oshinsky, LLP.

(57) ABSTRACT

In a data communication network, a first connection is established over a wireless link between a terminal and a router and a second connection is established between the router and a server over a land-line network. Communication protocol data necessary for communication control with the server is transferred from the terminal to the router. A data signal from the terminal is received at the router and converted into a packet according to communication protocol defined by the transferred protocol data between the router and the server and then transmitted to the server. A data signal from the server is received at the router and converted into a packet according to communication protocol defined by the transferred protocol data between the router and the terminal and then transmitted to the terminal.

14 Claims, 7 Drawing Sheets

MOBILE TERMINAL

ROUTER

TO FIG. 3B

HIGH THROUGHPUT WIRELESS DATA COMMUNICATION USING TRANSFERRED PROTOCOL DATA FOR COMMUNICATION ACROSS LAND-LINE NETWORK

BACKGROUND OF THE INVENTION

1. Field of the Invention

The present invention relates to a data communication system which is particularly useful for applications which suffer from noisy channels.

2. Description of the Related Art

In data communication systems, automatic repeat request is a well known mechanism for recovering transmission errors. A timer is started when the transmit end sends an information frame and waits for acknowledgment. When an acknowledgment frame is not returned from the receive end within a predefined time interval set by the timer, the transmit end recognizes that the transmitted frame is corrupted and retransmits a copy of the transmitted frame. The time interval of the timer is usually determined based on the time taken for the receive end to acknowledge a transmitted frame. If transmitted frames are lost or corrupted due to channel noise, timeouts and retransmissions are repeated at the transmit end, severely deteriorating the throughput of the network. In addition, transmission delays unexpectedly occur in communications networks. Due to transmission delays, timeouts occur even if transmitted frames are received at the distant end. If a communication channel contains a noisy section such as wireless link, transmission delays of the network would cause the transmit end to repeat unnecessary retransmissions over the wireless link, and the throughput of the network is severely degraded.

SUMMARY OF THE INVENTION

It is therefore an object of the present invention to provide a high throughput wireless data communication method and system.

The object of the present invention is obtained by reducing overhead of packets of a data communication network by transferring communication protocol data from a wireless section to a land-line section of the network.

According to a first aspect of the present invention, there is provided a data communication method comprising establishing a first connection over a wireless link between a first site and a second site and a second connection between the second site and a third site over a land-line network, transferring, from the first site to the second site, communication protocol data necessary for communication control with the third site, receiving, at the second site, a data signal from the first site and converting the received data signal into a packet according to communication protocol defined by the transferred protocol data between the second site and the third site and transmitting the packet to the third site, and receiving, at the second site, a data signal from the third site and converting the received data signal into a packet according to communication protocol defined by the transferred protocol data between the second site and the first site and transmitting the packet to the first site.

According to a second aspect, the present invention provides a data communication method comprising establishing a connection between first and second sites, dividing data, at the first site, into a plurality of data blocks of first length according to a record of packets in error received at the first site, and transmitting the data blocks in packets of the first length from the first site over the established connection to the second site, receiving the transmitted packets at the second site, evaluating the received packets and returning a signal from the second site to the first site, requesting data blocks to be retransmitted, if there is at least one packet in error or lost, and receiving the signal at the first site, dividing the data blocks requested by the received signal into blocks of second length smaller than the first length and transmitting the divided data blocks in packets of the second length over the established connection from the first site to the second site.

BRIEF DESCRIPTION OF THE DRAWINGS

The present invention will be described in further detail with reference to the accompanying drawings, in which.

DETAILED DESCRIPTION

Figure 1:
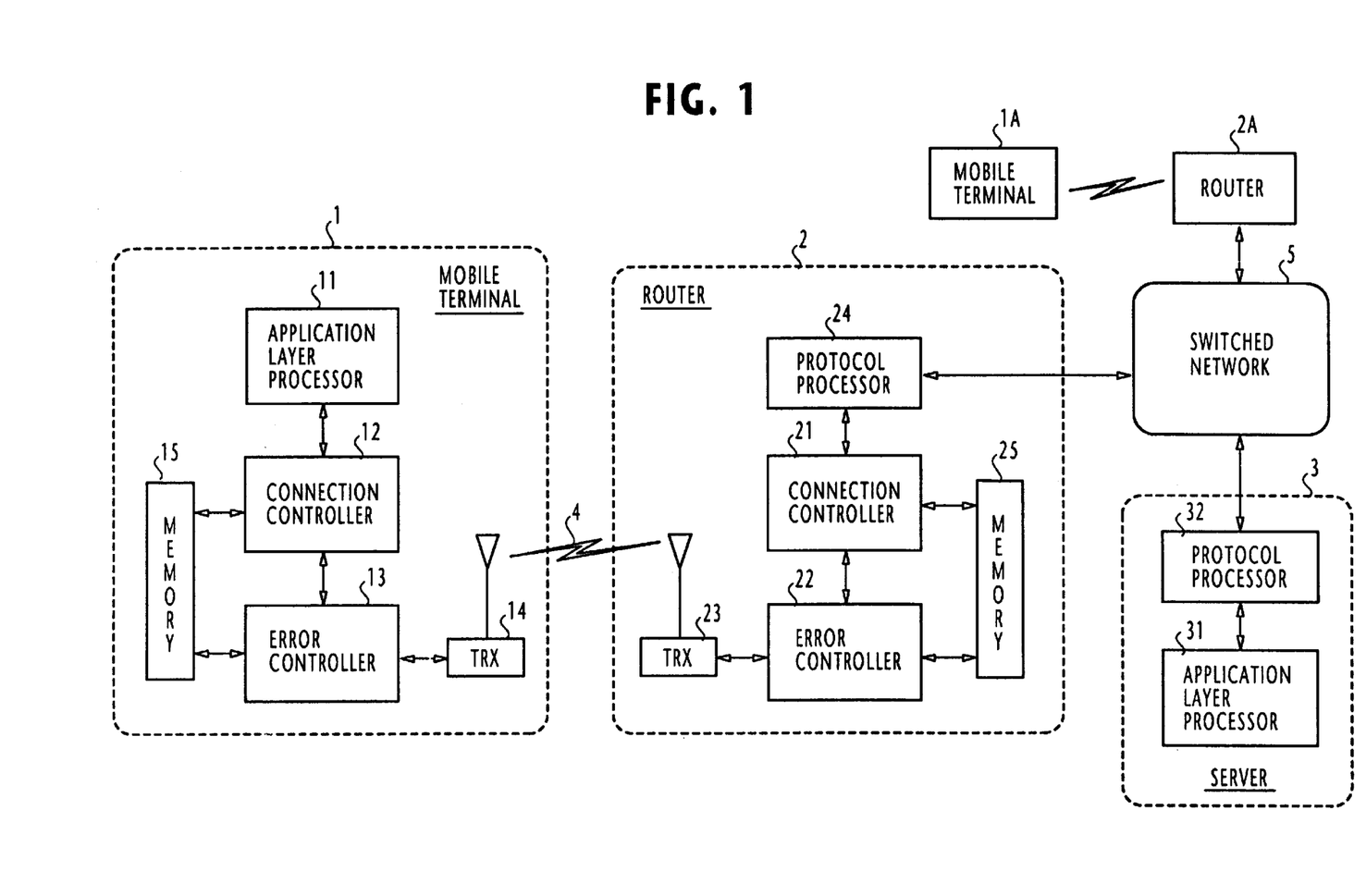
FIG. 1 is a block diagram of a data communication system of the present invention.

Referring now to FIG. 1, there is shown a wireless data communication system according to the present invention. The system comprises a plurality of wireless access routers connected to a switched telecommunication network 5. Only two wireless routers 2 and 2A are illustrated for simplicity for communication with wireless mobile terminals 1 and 1A, respectively. A server 3 is connected to the switched telecommunication network 5. For the purpose of disclosure, the following description is concerned with a communication between the mobile terminal 1 and the server 3 via the router 2 and the switched telecommunication network 5.

Mobile terminal 1 comprises an application layer processor 11 which uses a file transfer client program, for example, for transmission of file data from the mobile terminal to the server 3 which uses a file transfer server program. A connection controller 12 is connected to the application layer processor 11 to respond to a connection setup request from the processor 11 for exchanging control frames with a connection controller 21 of the router using connection identifiers during a data transmission phase of the end-to-end communication and provides an interface between the application layer processor 11 and an error controller 13 which is connected to a wireless transceiver 14. Error controller 13 performs error check on frames received from the router and stores a record of the error check and received data in a memory 15 which is also connected to the connection controller 12.

Access route 2 includes a wireless transceiver 23 for establishing a wireless link 4 with the wireless transceiver 14 of the mobile terminal. An error controller 22 is connected between the wireless transceiver 23 and the connection controller 21. Similar to the mobile terminal, a memory 25 is connected to the connection controller 21 and the error controller 23. A protocol processor 24 is connected between the connection controller 21 and the switched network 5 to perform management of connections established between the router and the destination, using connection identifiers.

Server 3 includes an application layer processor 31 and a protocol processor 32. Application layer processor 31 uses a file transfer server program to exchange data with the application layer processor 11. Protocol processor 32 cooperates with the protocol processor 24 of the router for the management of the established connections.

The operation of the system between the mobile terminal 1 and the server 3 will proceed as follows.

Figure 2A:
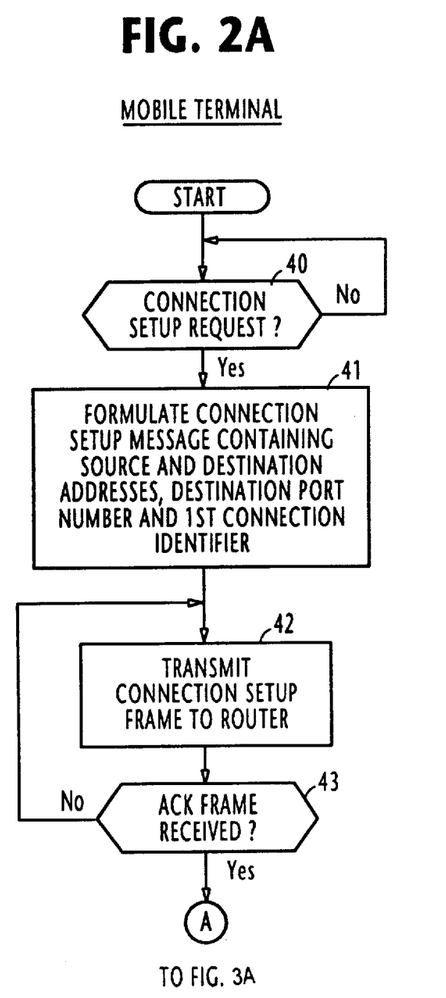
FIGS. 2A and 2B are flowcharts of the respective operations of a wireless mobile terminal and a wireless access router when a connection is established between the mobile terminal and the router.

In FIG. 2A, when the mobile terminal 1 wishes to communicate with the remote server 3, the application layer processor 11 of the mobile terminal formulates a connection setup request with the host names of the source terminal 1 and the destination server 3 and the port number of the application layer processor 32 of the server and forwards it to the connection controller 12 (step 40). Connection controller 12 formulates a connection setup frame with the information contained in the connection setup request and a first connection identifier which uniquely identifies a connection established between the mobile terminal and the router and forwards it to the error controller 13 (step 41). Error controller 13 forwards the frame to the wireless transceiver 14 for transmission to the router 2 over the wireless link 4, so that protocol control data are transmitted to the router 2 (step 42). After transmission, the error controller 13 waits for an acknowledgement frame. When the mobile terminal 1 receives an acknowledgment frame from the router 2 within a predefined time interval (step 43), the error controller 13 informs the application layer processor 11 of the first connection identifier contained in the received acknowledgment frame, indicating that a connection is successfully established to the destination server 3, and flow terminates the connection setup routine. If the connection setup procedure fails, flow returns from step 43 to step 42 to retransmit a copy of the transmitted connection setup frame.

Figure 2B:
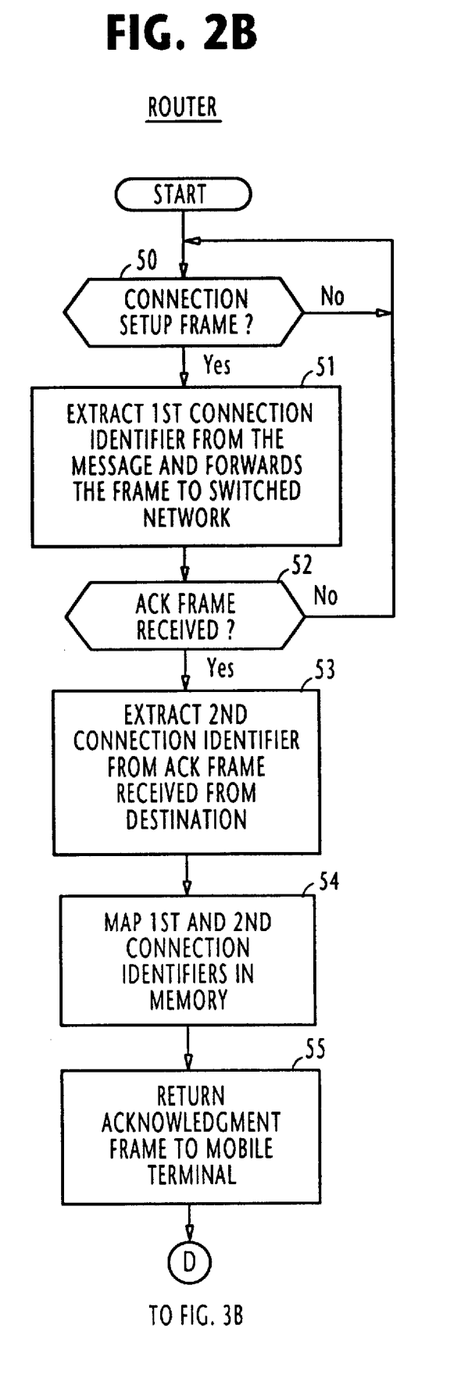

In FIG. 2B, when the router 2 receives the connection setup frame from the mobile terminal 1, the connection controller 21 issues a connection setup request to the protocol processor 24 (step 50), which responds to it by forwarding the received frame to the switch network 5 to establish a connection to the destination server 3 (step 51). After transmission of the connection setup frame to the switched network, the protocol processor 24 of the router 2 checks to see if an acknowledgment frame is received from the protocol processor 32 of the server (step 52). If so, the protocol processor 24 proceeds to step 53 to extract a second connection identifier which is contained in the received acknowledgment frame to uniquely identify the connection between the router 2 and the destination server 3. Protocol processor 24 hands the extracted second connection identifier over to the connection controller 21, which creates a table in the memory 25 for mapping the first connection identifier to the second connection identifier (step 54). The mapping table allows the router to establish a peer-to-peer relationship between the source and destination application entities on a frame-by-frame basis.

At step 55, the error controller 22 formulates an acknowledgment frame with the first connection identifier and sends it back to the mobile terminal, and then terminates the connection setup routine. If the connection controller 21 fails to receive acknowledgment from the destination within a prescribed interval, it proceeds from step 52 to step 50.

It is seen therefore that the information necessary for protocol control is handed over from the mobile terminal 1 to the router 2, so that protocol control can be effected between the router 2 and the server 3, instead of end-to-end protocol control between the mobile terminal 1 and the server 3. Thus, overhead which would otherwise be required for data communication between the mobile terminal 1 and the router 2 is reduced significantly. Therefore, high throughput data communication can be performed over the wireless link which would otherwise represent a bottle neck of the communication between the mobile terminal 1 and the server 3.

The data communication between the mobile terminal 1 and the server 3 via the router will be described below with reference to FIGS. 3A, 3B, 4A and 4B.

Figure 3A:
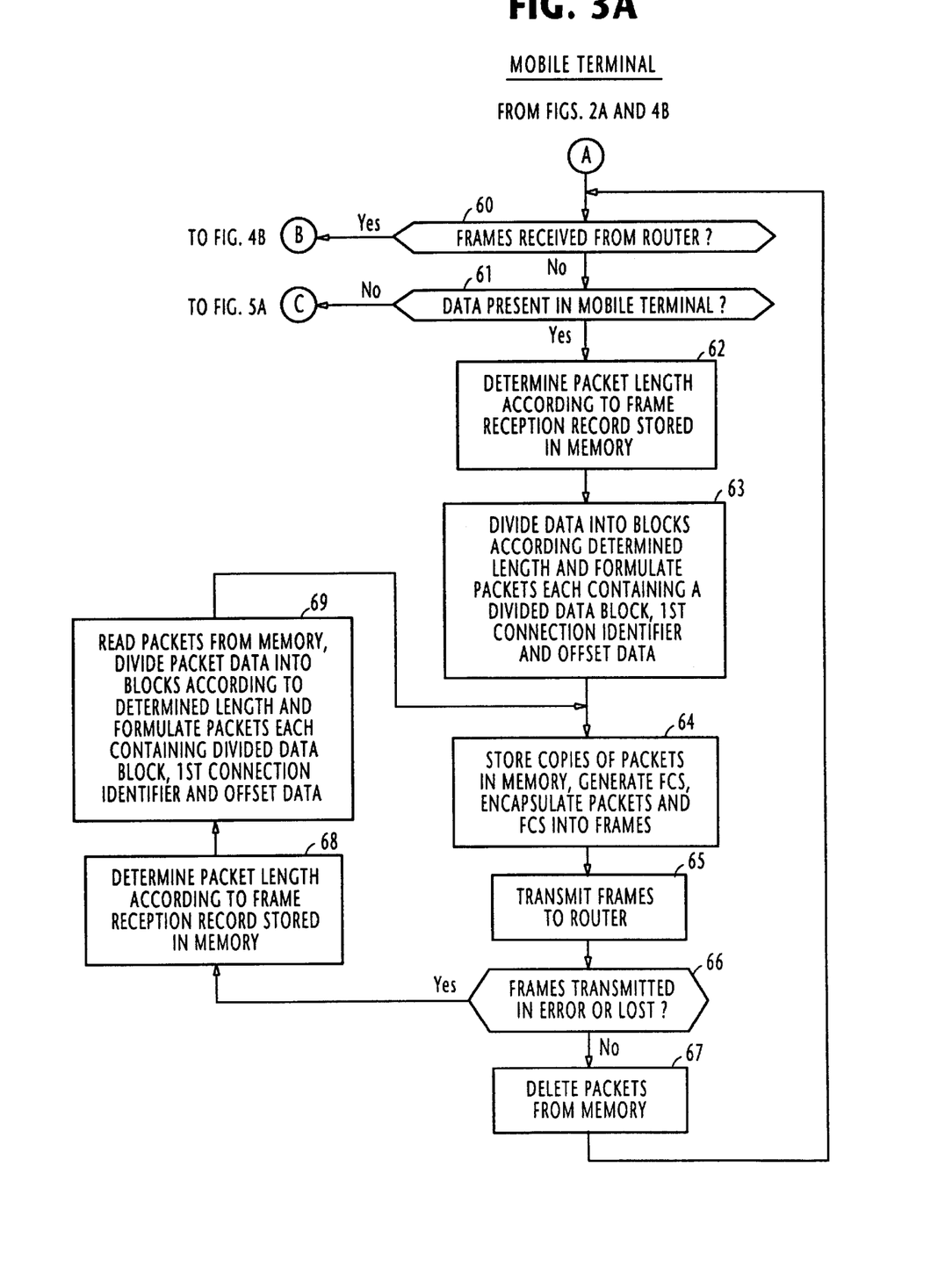
FIGS. 3A and 3B are flowcharts of the respective operations of the wireless mobile terminal and the router when frames are transmitted from the mobile terminal to the router.
Figure 3B:
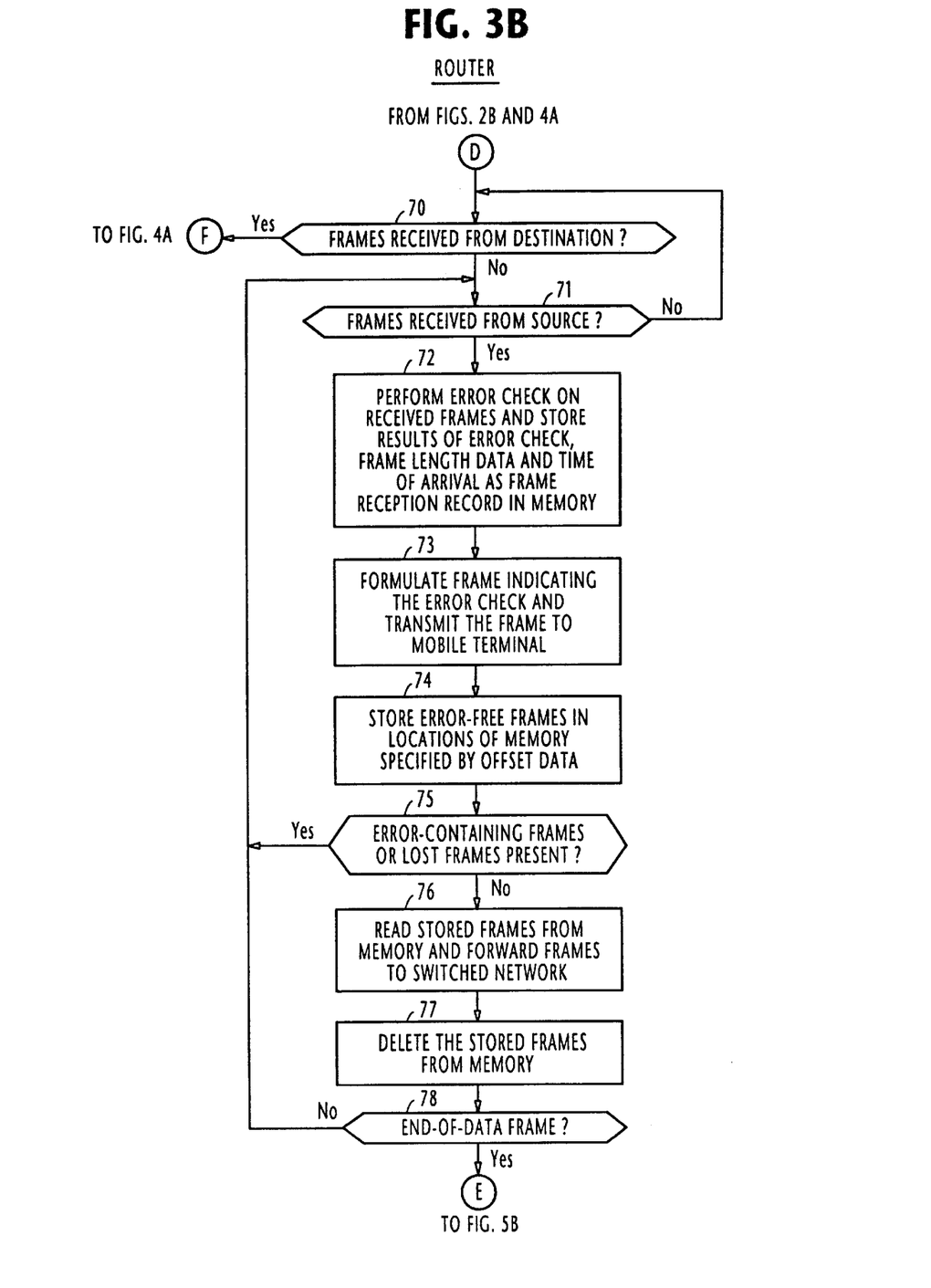
Figure 4A:
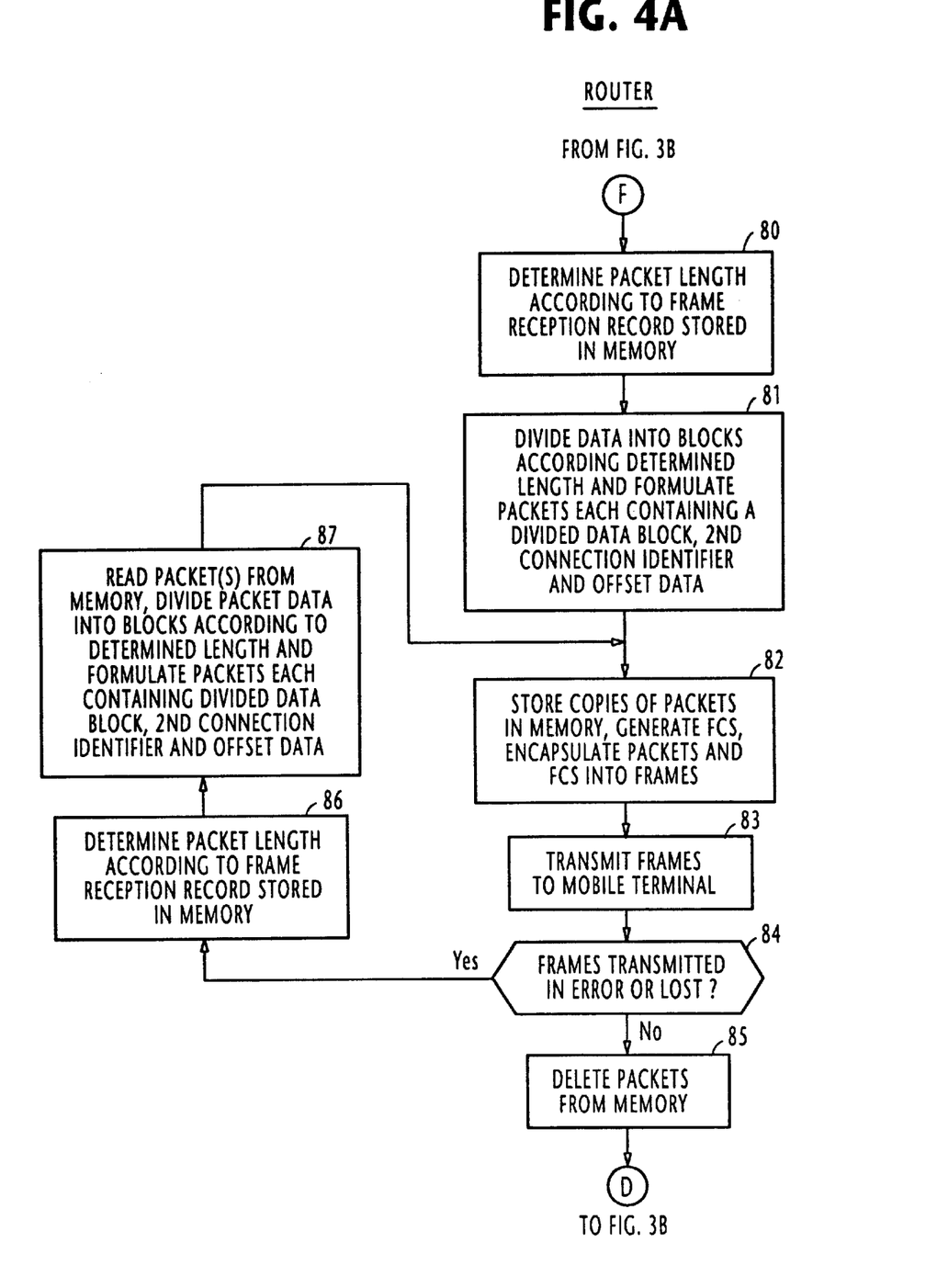
FIGS. 4A and 4B are flowcharts of the respective operations of the router and the mobile terminal when frames are transmitted from the router to the mobile terminal.
Figure 4B:
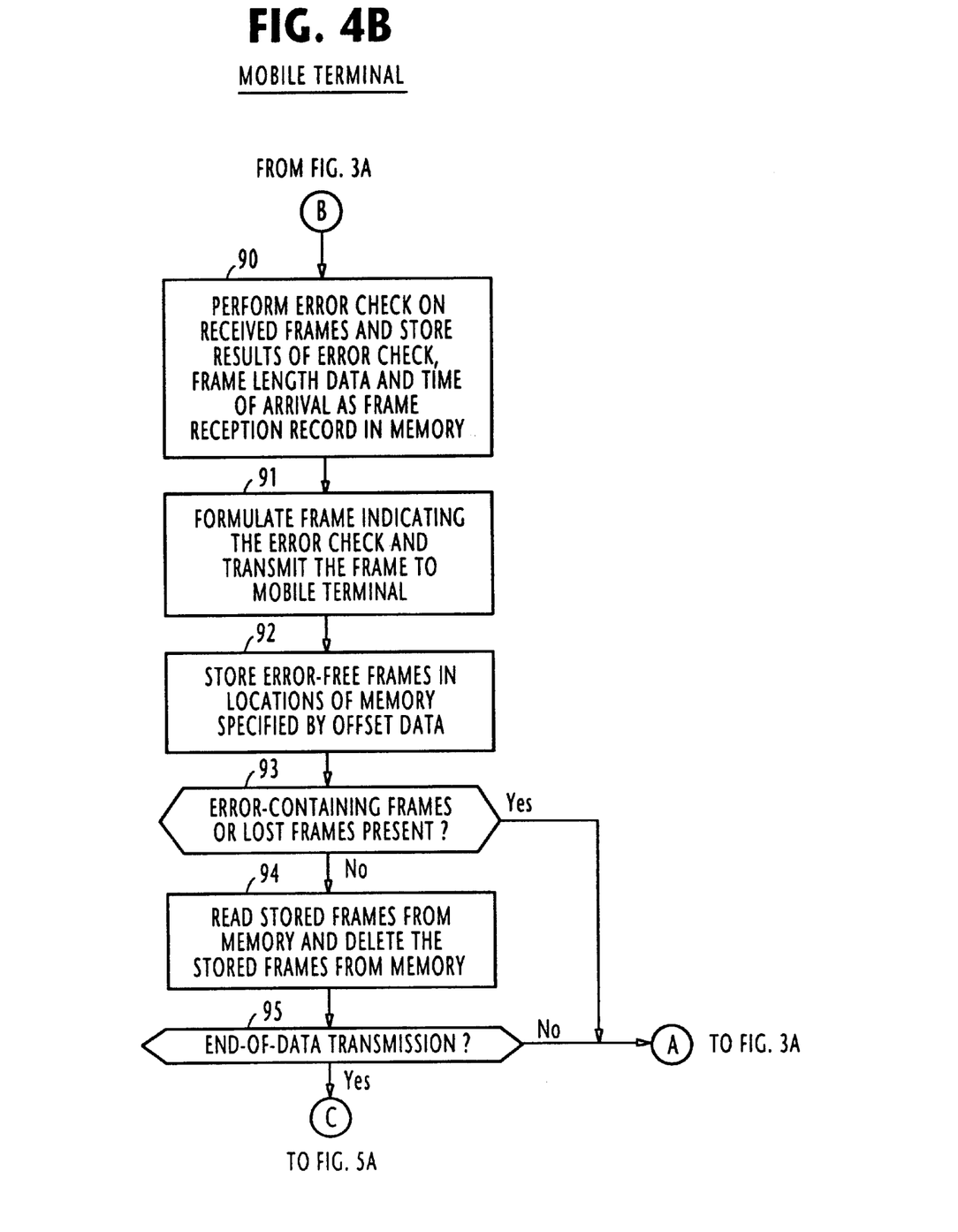

After establishing a connection between the source and the destination, the mobile terminal 1 executes a data transmission procedure according to the flowchart of FIG. 3A and the router 2 executes a data reception procedure on frames received from the server 3 according to the flowchart of FIG. 4A. On the other hand, the router executes a delay procedure on frames received from the mobile terminal 1 as shown in the flowchart of FIG. 3B and the mobile terminal 1 executes a data reception procedure on frames received from the router 2 as shown in the flowchart of FIG. 4B.

In Fig. 3A, the mobile terminal executes steps 60 and 61 to check to see if a frame is received from the router or transmit data is present in the mobile terminal. If no frame is received from the router and data is present in the mobile terminal 1, the application layer processor 11 of the mobile terminal issues a ready-to-send request containing data to be sent and the first connection identifier to the connection controller 12, which hands this request over to the error controller 13. Error controller 13 determines the length of packets according to a frame (base-to-mobile) reception record created in the memory 15 in a manner to be described later (step 62).

At step 63, the error controller 13 divides the data received from the connection controller into blocks according to the determined packet length and encapsulates each of the data blocks in a packet containing the first connection identifier and offset data indicating the position of the packet with respect to the starting point of the undivided original data. In this way, the original data is converted to a plurality of packets of the determined length.

At step 64, the packets are stored in the memory 15 and a frame check sequence is generated from each of these packets. Each packet and the corresponding FCS are encapsulated in a frame, and the frames prepared in this way at step 64, are successively transmitted from the mobile terminal 1 to the router 2 (step 65). Mobile terminal 1 receives a frame returning from the router, indicating results of error check by the router on the received mobile-transmitted frames. If the results of the transmission from the mobile terminal indicate that there is no error in the transmitted frames or no lost frame (step 66), flow proceeds to step 67 to delete the corresponding packets from the memory 15 and returns to step 60 to repeat the transmission procedure on data that follows. If the frame from the router indicates that there is at least one mobile-transmitted frame that is in error or lost, flow proceeds from step 66 to step 68 to determine the length of packets according to the base-to-mobile frame reception record in the memory 15.

At step 69, the mobile terminal reads packets from the memory corresponding to the disrupted frames and divides the data of each of these packets according to the packet length determined at step 68, and reformulates packets with the re-divided data blocks so that each reformulated packet contains the first communication identifier and offset data indicating its position relative to the starting point of the original data. Flow returns from step 69 to 64, so that copies of the re-formulated packets are stored into the memory 15 overwriting the previous packets, and frame check sequences and the re-formulated packets are encapsulated into frames and transmitted to the router (step 65). If transmit data is no longer present in the mobile terminal, the decision at step 61 is negative and flow proceeds to a connection cleardown process which will be described later with reference to FIG. 5A.

In FIG. 3B, the router 2 executes steps 70 and 71 to check to see if frames are received from the destination server 3 or from the source mobile terminal 1. If the router receives frames from the mobile terminal, it proceeds form step 71 to step 72 to perform an error check on the received frames and determine their lengths. The results of the error check, the time of day of their arrival and frame length data are stored and cached in the memory 25 as a frame (mobile-to-base) reception record indicating a quality level of the established wireless connection 5. As will be described, this frame reception record will be used by the router to determine the length of base-to-mobile frames if the record is updated at prescribed intervals.

At step 73, the router formulates a frame indicating the results of the error check and returns it to the mobile terminal. Router 2 stores, at step 74, error-free frames in locations of the memory 25 which are specified by the offset data contained in these frames. At step 75, the router determines whether there is at least one error-containing frame or at least one lost frame. If so, flow returns from step 75 to step 71 to receive frames which will be retransmitted from the mobile terminal. Otherwise, flow proceeds from step 75 to step 76 to read the error-free frames from the memory 25 and forward them to the switched network 5, which will then route the frames to the destination server 3. At step 77, the stored frames are deleted from the memory 25. Router 2 checks to see if there is an end-of-data frame from the mobile terminal (step 78). If there is none, flow returns from step 78 to step 71 to repeat the frame reception process. If an end-of-data frame is received, the decision at step 78 is affirmative and the router proceeds to a connection cleardown procedure shown in the flowchart of FIG. 5B which will be described later.

If the server receives base-transmitted frames from the router, the decision at step 70 of FIG. 3B is affirmative and the router proceeds to the data reception procedure of FIG. 4A, which is similar to the data reception procedure of FIG. 3A at the mobile terminal.

In FIG. 4, the router determines, at step 80, the length of packets according to the frame (mobile-to-base) reception record created in the memory 25 at step 72 of FIG. 3B. At step 81, the data contained in the received frames are divided into blocks according to the determined packet length and encapsulates each of the data blocks in a packet containing a second connection identifier and offset data indicating the position of the packet with respect to the starting point of the undivided data. In this way, the received frames are converted to packets of lengths appropriate to the quality of the wireless link 4.

At step 82, the packets are from the memory 25 and a frame check sequence is generated from each of these packets. Each packet and the corresponding FCS are encapsulated in a frame, and the frames prepared in this way at step 82, are successively transmitted form the router to the mobile terminal (step 83). Router 2 receives a frame returning from the mobile terminal, indicating results of error check by the mobile terminal on the received base-transmitted frames. If the results of the transmission from the router indicate that there is no error in the transmitted frames or no lost frame (step 84), flow proceeds to step 85 to delete the corresponding packets from the memory 25 and returns to step 70 of FIG. 3B to repeat the data transmission procedure on frames that follow.

If the frame from the mobile terminal indicates that there is at least one base-transmitted frame which is in error or lost, the decision at step 84 is affirmative and flow proceeds to step 86 to determine the length of packets according to the frame reception record. At step 87, the router reads packets from the memory 25 corresponding to the disrupted frames and divides the data of each of these packets according to the packet length determined at step 86, and re-formulates packets with the re-divided data blocks so that each re-formulated packet contains the second connection identifier and offset data indicating its position relative to the starting point of the original data. Flow returns from step 87 to step 82, so that copies of the re-formulated packets are stored into the memory 25 overwriting the previous packets, and frame check sequences and the re-formulated packets are encapsulated into frames and transmitted to the mobile terminal (step 83).

If the mobile terminal receives base-transmitted frames from the router, the decision at step 60 of FIG. 3A is affirmative and flow proceeds to a data reception procedure of FIG. 4B, which is similar to the data reception procedure of FIG. 3B at the router.

In FIG. 4B, the data reception procedure begins with step 90 in which the mobile terminal performs an error check on the received frames and determines their lengths, and stores the results of the error check, the time of day of their arrival and frame length data in the memory 15 as a frame (base-to-mobile) reception record. This frame reception record is the one used at step 62 of FIG. 3A by the mobile terminal when executing the data transmission procedure. At step 91, the mobile terminal formulates a frame indicating the results of the error check and returns it to the router. At step 92, the mobile terminal 1 stores error-free frames in locations of the memory 15 which are specified by the offset data contained in these frames.

At step 93, the mobile terminal determines whether there is at least one error-containing frame or at least one lost frame. If so, flow returns from step 93 to step 60 of FIG. 3A to receive frames which will be retransmitted from the router. Otherwise, flow proceeds from step 83 to step 94 to read the error-free frames from the memory 15 and delete the read frames from the memory 15. At step 95, the mobile station 1 checks to see if there is an end-of-transmission frame from the router. If there is none, flow returns from step 95 to step 60 of FIG. 3A to repeat the frame reception process. If the mobile terminal receives an end-of-transmission frame from the router, the decision at step 95 is affirmative and the mobile terminal proceeds to a connection cleardown procedure shown in the flowchart of FIG. 5A.

Figure 5A:
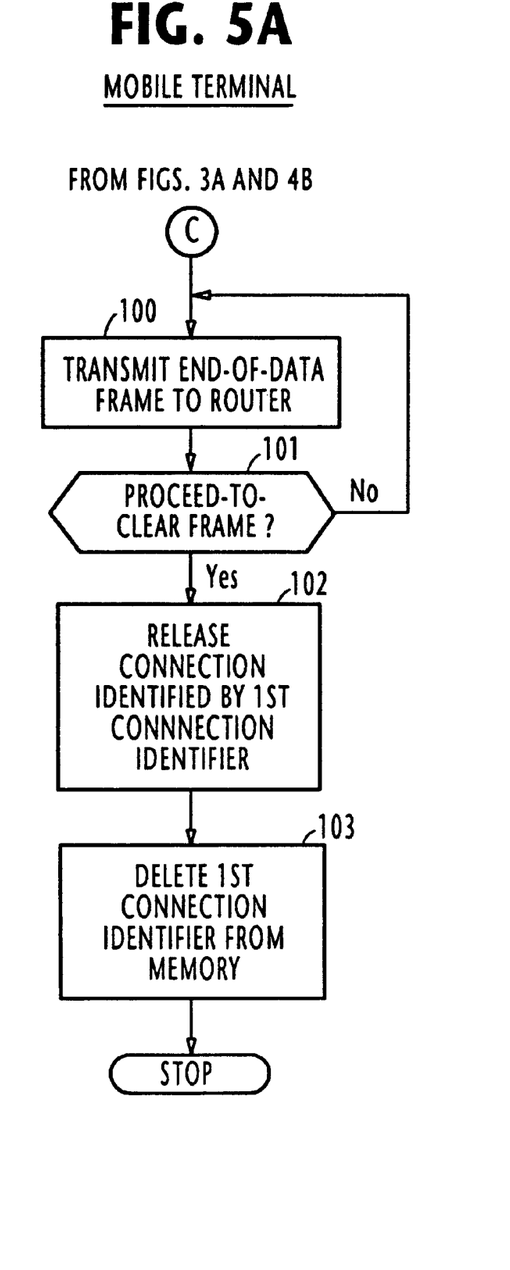
FIGS. 5A and 5B are flowcharts of the respective operations of the mobile terminal and the router when the connection is cleared.
Figure 5B:
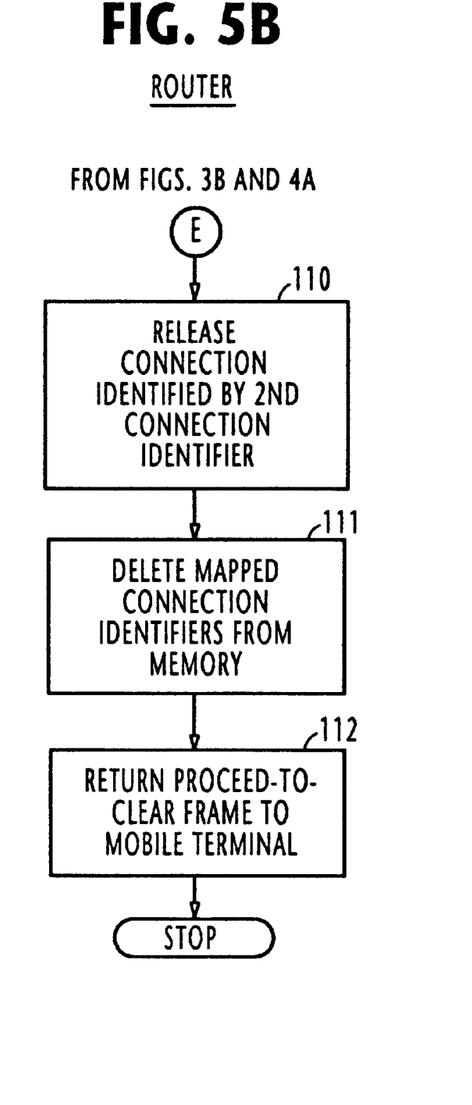

In FIG. 5A, the connection cleardown procedure of the mobile terminal begins with step 100 in which it transmits an end-of-data frame to the router, which receives it at step 78 (FIG. 3B) and proceeds to step 110 (FIG. 5B) in which it releases the connection identified by the second connection identifier. At step 111, the router deletes the mapping between the first and second connection identifiers from the memory 25 and returns a proceed-to-clear frame to the mobile terminal (step 112). Upon receipt of the proceed-to-clear frame (step 101), the mobile terminal proceeds to step 102 to release the connection identified by the first connection identifier and deletes the first connection identifier from the memory 15 (step 103).

What is claimed is:

1. A data communication method comprising:

transmitting data signals over a wireless link from a first site to a second site and determining, at the second site, a first communication protocol parameter to be used between the first and second sites based on an error record of the received data signals;

transmitting data signals over a wire-line circuit from a third site to the second site and determining, at the second site, a second communication protocol parameter to be used between the second and third sites based on an error record of the received data signals;

receiving, at said second site, a data signal from said first site and converting the received signal according to the second communication protocol parameter, and transmitting the converted signal to the third site; and receiving, at said second site, a data signal from said third site and converting the received signal according to the first communication protocol parameter, and transmitting the converted signal to the first site.

2. A data communication method as claimed in claim 1, further comprising:

evaluating, at said second site, packets received from said first site and producing a record of the evaluated packets; and determining, at said second site, the length of packets to be transmitted from the second site to said first site according to said record.

3. A data communication method as claimed in claim 2, further comprising:

evaluating, at said first site, packets received from said second site and producing a record of the evaluated packets;

determining, at said first site, the length of packets to be transmitted from the first site to the second site according to the record.

4. A data communication method as claimed in claim 2, wherein said communication protocol data comprises a first identifier for identifying said first connection and a second identifier for identifying said second connection.

5. A data communication method as claimed in claim 1, further comprising:

evaluating, at said first site, packets received from said second site and producing a record of the evaluated packets;

determining, at said first site, the length of packets to be transmitted from the first site to the second site according to the record.

6. A data communication method as claimed in claim 1, wherein said communication protocol data comprises a first identifier for identifying said first connection and a second identifier for identifying said second connection.

7. A data communication method as claimed in claim 1, wherein said first communication protocol parameter represents the length of each data signal exchanged between the first and second sites, and wherein the second communication protocol parameter represents the length of each data signal exchanged between the second and third sites.

8. A data communication system comprising:

a first site;

a second site connected to the first site via a wireless link; and a third site connected to the second site via a wire-line circuit;

said second site receiving data signals from said first site and determining a first communication protocol parameter to be used between the first and second sites based on an error record of the received data signals and receiving data signals from said third site and determining a second communication protocol parameter to be used between the second and third sites based on an error record of the received data signals, said second site receiving a data signal from the first site, converting the data signal according to the second protocol and transmitting the converted data signal to the third site, and receiving a data signal from said third site, converting the data signal according to the first protocol and transmitting the converted signal to the first site.

9. A data communication system as claim in claim 8, wherein said first site is arranged to:

evaluate packets received from said second site, produce a record of the evaluated packets, and determine the length of packets to be transmitted from the first site to the second site according to the record.

10. A data communication system as claimed in claim 8, wherein said second site is arranged to:

evaluate packets received from said first site, produce a record of the evaluated packets, and determine the length of packets to be transmitted from the second site to said first site according to said record.

11. A data communication system as claimed in claim 10, wherein said first site is arranged to:

evaluate packets received from said second site, produce a record of the evaluated packets, and determine the length of packets to be transmitted from the first site to the second site according to the record.

12. A data communication system as claimed in claim 10, wherein said communication protocol data comprises a first identifier for identifying a connection between said first site and said second site and a second identifier for identifying a connection between said second site and said third site.

13. A data communication system as claimed in claim 8, wherein said communication protocol data comprises a first identifier for identifying a connection between said first site and said second site and a second identifier for identifying a connection between said second site and said third site.

14. A data communication system as claimed in claim 8, wherein said first communication protocol parameter represents the length of each data signal exchanged between the first and second sites, and wherein the second communication protocol parameter represents the length of each data signal exchanged between the second and third sites.

* * * * *